(12) United States Patent
Choi et al.

(10) Patent No.: US 12,555,678 B2
(45) Date of Patent: Feb. 17, 2026

(54) SURGICAL TOOL CONTROL APPARATUS

(71) Applicant: LN ROBOTICS INC., Seoul (KR)

(72) Inventors: Jae Soon Choi, Seoul (KR); Young Hak Kim, Seoul (KR); Youngjin Moon, Seoul (KR)

(73) Assignee: LN ROBOTICS INC., Seoul (KR)

( * ) Notice: Subject to any disclaimer, the term of this patent is extended or adjusted under 35 U.S.C. 154(b) by 289 days.

(21) Appl. No.: 18/251,671

(22) PCT Filed: Sep. 30, 2021

(86) PCT No.: PCT/KR2021/013435
§ 371 (c)(1),
(2) Date: May 3, 2023

(87) PCT Pub. No.: WO2022/108102
PCT Pub. Date: May 27, 2022

(65) Prior Publication Data
US 2024/0013907 A1      Jan. 11, 2024

(30) Foreign Application Priority Data

Nov. 18, 2020  (KR) .................. 10-2020-0154269
Dec. 23, 2020  (KR) .................. 10-2020-0181924

(51) Int. Cl.
*A61B 34/37*      (2016.01)
*G16H 40/63*     (2018.01)

(52) U.S. Cl.
CPC ................... *G16H 40/63* (2018.01)

(58) Field of Classification Search
CPC .......... G16H 40/63; A61B 2017/00862; A61B 34/70; A61B 34/71; A61B 2017/00858;
(Continued)

(56) References Cited

U.S. PATENT DOCUMENTS 10,765,487 B2 *   9/2020  Ho ......................... A61B 34/30
10,792,466 B2 *  10/2020  Landey ............. A61M 25/0136
(Continued)

FOREIGN PATENT DOCUMENTS

CN    111529065 A    8/2020
JP    11-178891 A    7/1999
(Continued)

OTHER PUBLICATIONS

International Search Report & Written Opinion mailed on Jan. 11, 2022 in PCT/KR2021/013435 filed on Sep. 30, 2021 (8 pages).

*Primary Examiner* — Masud Ahmed
(74) *Attorney, Agent, or Firm* — Oblon, McClelland, Maier & Neustadt, L.L.P.

(57) ABSTRACT

A surgical tool control apparatus according to an embodiment comprises: a housing; and a control assembly including a frame connected to the housing, and a first roller module, a second roller module, and a third roller module which are installed on the frame, wherein the second roller module can horizontally move toward the first roller module so that a first surgical tool can be held between the first roller module and the second roller module, and can horizontally move toward the third roller module so that a second surgical tool can be held between the second roller module and the third roller module.

21 Claims, 17 Drawing Sheets

(58) Field of Classification Search
CPC .... A61B 2017/22094; A61B 2034/715; A61B 34/30; A61B 2034/301
See application file for complete search history.

(56) References Cited

U.S. PATENT DOCUMENTS

| | | | | |
|---|---|---|---|---|
| 11,027,105 | B2 * | 6/2021 | Matlock | A61B 1/233 |
| 11,114,918 | B2 * | 9/2021 | Zirps | H02K 16/00 |
| 11,272,995 | B2 * | 3/2022 | Landey | B25J 9/1035 |
| 11,559,322 | B2 * | 1/2023 | Algawi | A61B 5/062 |
| 2012/0090153 | A1 | 4/2012 | Spreitzer et al. | |
| 2019/0365491 | A1 * | 12/2019 | Yu | A61B 34/30 |
| 2021/0196293 | A1 * | 7/2021 | Lin | A61B 1/307 |

FOREIGN PATENT DOCUMENTS

| | | |
|---|---|---|
| JP | 2016-140644 A | 8/2016 |
| JP | 2017-018619 A | 1/2017 |
| JP | 2019-025339 A | 2/2019 |
| JP | 6751872 B2 | 9/2020 |
| JP | 2022-169814 | 11/2022 |
| KR | 10-1374492 B1 | 3/2014 |
| KR | 10-2018-0103953 A | 9/2018 |
| KR | 10-1958273 B1 | 3/2019 |
| KR | 10-2019-0121928 A | 10/2019 |

\* cited by examiner

SURGICAL TOOL CONTROL APPARATUS

TECHNICAL FIELD

The following embodiments relate to a surgical tool control apparatus.

BACKGROUND ART

The existing percutaneous coronary intervention (PCI) procedure has the risk of continuous radiation exposure of operators, requires a great amount of time and cost to train skilled operators to the level where stable surgical procedures are possible, and has degrees of completion of the procedure with a large gap between operators/regions/hospitals, making it difficult to universally provide high-quality medical services.

Interventional assistant robots have been introduced to compensate for the above disadvantages, but most of the assistant robots are configured to control only one set of surgical tools. Thus, the interventional assistant robots of the related art are applicable only to procedures for lesions of low difficulty and are difficult to be applied when multiple surgical tools are required, such as chronic total occlusion (CTO) lesions.

Therefore, there is a demand for a surgical tool control apparatus capable of independently controlling a plurality of surgical tools to be applicable to complex PCI.

The above description has been possessed or acquired by the inventor(s) in the course of conceiving the present disclosure and is not necessarily an art publicly known before the present application is filed.

DISCLOSURE OF THE INVENTION

Technical Goals

An object of an embodiment is to provide a surgical tool control apparatus capable of being applied to complicated percutaneous coronary intervention.

Another object of an embodiment is to provide a surgical tool control apparatus capable of independently controlling a plurality of surgical tools.

Technical Solutions

A surgical tool control apparatus according to an embodiment includes a housing, and a control assembly including a frame connected to the housing, and a first roller module, a second roller module, and a third roller module installed on the frame. The second roller module is configured to horizontally move toward the first roller module so that a first surgical tool is gripped between the first roller module and the second roller module, and horizontally move toward the third roller module so that a second surgical tool is gripped between the second roller module and the third roller module.

Each of the first roller module, the second roller module, and the third roller module may include a roller plate connected to the frame, and a roller member rotatably provided on the roller plate.

In a state in which the first surgical tool or the second surgical tool is gripped, the gripped first surgical tool or second surgical tool may be moved in a longitudinal direction by rotating the roller members of a pair of roller modules gripping the first surgical tool or the second surgical tool.

In a state in which the first surgical tool or the second surgical tool is gripped, the gripped first surgical tool or second surgical tool may be rotated by vertically moving at least one of the roller members of a pair of roller modules gripping the first surgical tool or the second surgical tool.

The roller plate may include a lower roller plate which is connected to the frame, and an upper roller plate which is positioned above the lower roller plate and to which the roller member is rotatably connected, and the second roller module may further include a vertical movement portion configured to vertically move the upper roller plate with respect to the lower roller plate.

The second roller module may further include a link structure support with a length which is changeable in a vertical direction in response to a spacing distance between the lower roller plate and the upper roller plate, while supporting the upper roller plate with respect to the lower roller plate.

The vertical movement portion may include a vertical movement driving motor, a vertical movement pulley configured to receive rotational power from the vertical movement driving motor, a vertical movement lead screw nut integrally rotating with the vertical movement pulley, and a vertical movement lead screw that is engaged with the vertical movement lead screw nut and has one side connected to the upper roller plate to vertically move the upper roller plate in accordance with rotation of the vertical movement lead screw nut.

The second roller module may further include a rotation driving portion configured to rotate the roller member with respect to the roller plate.

The rotation driving portion may include a rotation driving motor, a rotation drive pulley configured to receive rotational power from the rotation driving motor, a spline nut integrally rotating with the rotation drive pulley, and a spline shaft that is engaged with the spline nut and has one side connected to the roller member to rotate the roller member in accordance with rotation of the spline nut.

The rotation driving portion may further include a shaft support configured to be positioned between the rotation drive pulley and the spline shaft to prevent wobble of the spline shaft.

The control assembly may further include a horizontal movement portion configured to horizontally move the second roller module.

The horizontal movement portion may include a horizontal movement driving motor, a horizontal movement lead screw configured to be connected to the frame in a horizontal direction and receive rotational power from the horizontal movement driving motor, and a horizontal movement lead screw nut that is engaged with the horizontal movement lead screw and has one side connected to the roller plate to horizontally move the roller plate in accordance with rotation of the horizontal movement lead screw.

The surgical tool control apparatus may further include a guide catheter rotating portion provided in the housing to rotate a guide catheter connected to a front end of the surgical tool control apparatus.

The surgical tool control apparatus may further include a housing translational movement portion configured to move the housing forward or backward to a position where the surgical tool control apparatus is installed, to move a guide catheter connected to a front end of the surgical tool control apparatus forward or backward.

The surgical tool control apparatus may further include a housing tilting portion configured to tilt the housing with respect to a position where the surgical tool control apparatus is installed.

The surgical tool control apparatus may further include a first clamping portion configured to clamp the first surgical tool in a state in which the first surgical tool is not gripped by the first roller module and the second roller module, and a second clamping portion configured to clamp the second surgical tool in a state in which the second surgical tool is not gripped by the second roller module and the third roller module.

Each of the first clamping portion and the second clamping portion may include a clamp, and an elastic body configured to press the clamp in one direction so that the clamp clamps a surgical tool.

In a process in which the second roller module horizontally moves toward the first roller module to grip the first surgical tool between the first roller module and the second roller module, the second roller module may be configured to release the clamping of the first surgical tool by the first clamping portion by pushing the clamp of the first clamping portion in the other direction, and in a process in which the second roller module horizontally moves toward the third roller module to grip the second surgical tool between the second roller module and the third roller module, the second roller module may be configured to release the clamping of the second surgical tool by the second clamping portion by pushing the clamp of the second clamping portion in the other direction.

The surgical tool control apparatus may further include a surgical tool supporter provided in the housing and positioned at a rear side of the first roller module, the second roller module, and the third roller module, and configured to support a rear side of the first surgical tool or the second surgical tool.

The control assembly may further include a fourth roller module and a fifth roller module, and the fourth roller module may be configured to horizontally move toward the third roller module so that a third surgical tool is gripped between the third roller module and the fourth roller module, and horizontally move toward the fifth roller module so that a fourth surgical tool is gripped between the fourth roller module and the fifth roller module.

In a state in which the first roller module and the second roller module grip the first surgical tool and the third roller module and the fourth roller module grip the third surgical tool, the surgical tool control apparatus may be configured to independently control each of the first surgical tool and the third surgical tool, and in a state in which the second roller module and the third roller module grip the second surgical tool and the fourth roller module and the fifth roller module grip the fourth surgical tool, the surgical tool control apparatus may be configured to independently control each of the second surgical tool and the fourth surgical tool.

Effects

The surgical tool control apparatus according to an embodiment may independently control a plurality of surgical tools.

The surgical tool control apparatus according to an embodiment may be applied to complicated PCI.

The effects of the surgical tool control apparatus are not limited to the above-mentioned effects, and other unmentioned effects can be clearly understood from the above description by those having ordinary skill in the technical field to which the present disclosure pertains.

BEST MODE FOR CARRYING OUT THE INVENTION

Figure 1:
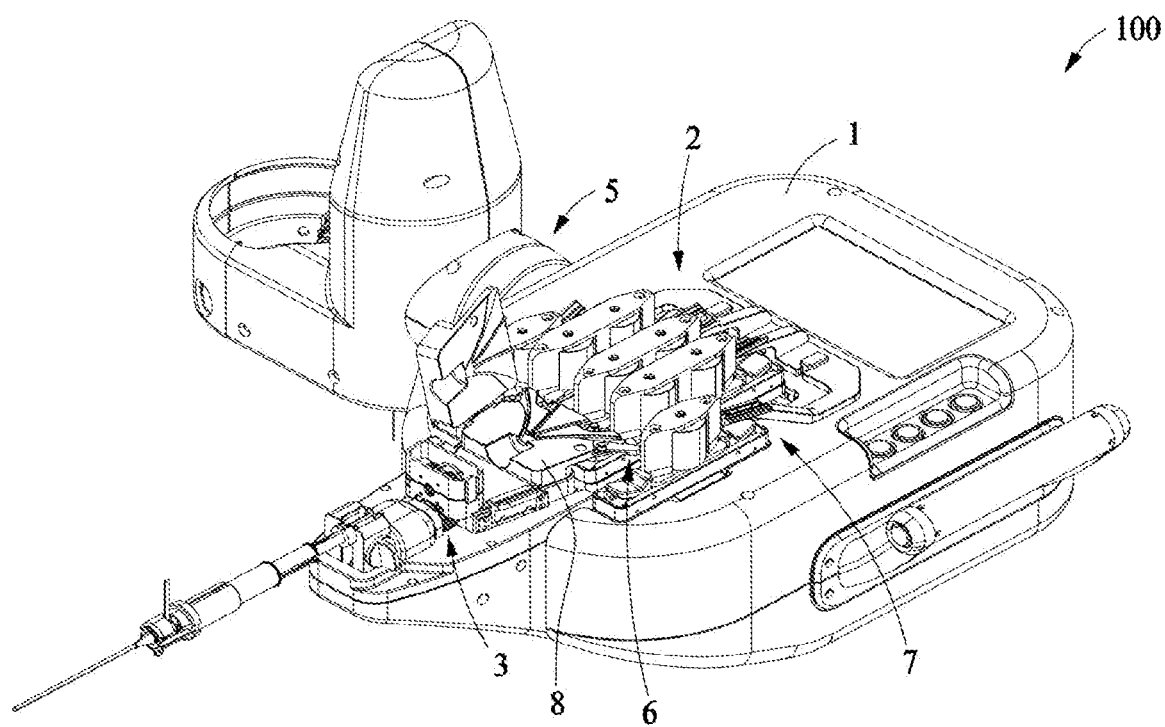
FIG. 1 is a perspective view illustrating a surgical tool control apparatus according to an embodiment.

Hereinafter, embodiments will be described in detail with reference to the accompanying drawings. However, various alterations and modifications may be made to the embodiments. Here, the embodiments are not construed as limited to the disclosure. The embodiments should be understood to include all changes, equivalents, and replacements within the idea and the technical scope of the disclosure.

The terminology used herein is for the purpose of describing particular embodiments only and is not intended to be limiting. The singular forms "a," "an," and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the embodiments with reference to the accompanying drawings, like reference numerals refer to like components and a repeated description related thereto will be omitted. In the description of embodiments, detailed description of well-known related structures or functions will be omitted when it is deemed that such description will cause ambiguous interpretation of the present disclosure.

In addition, terms such as first, second, A, B, (a), (b), and the like may be used to describe components of the embodiments. These terms are used only for the purpose of discriminating one component from another component, and the nature, the sequences, or the orders of the components are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the embodiments described above and an element having a common function. Unless otherwise mentioned, the descriptions of the embodiments may be applicable to the following embodiments and thus, duplicated descriptions will be omitted for conciseness.

Figure 2:
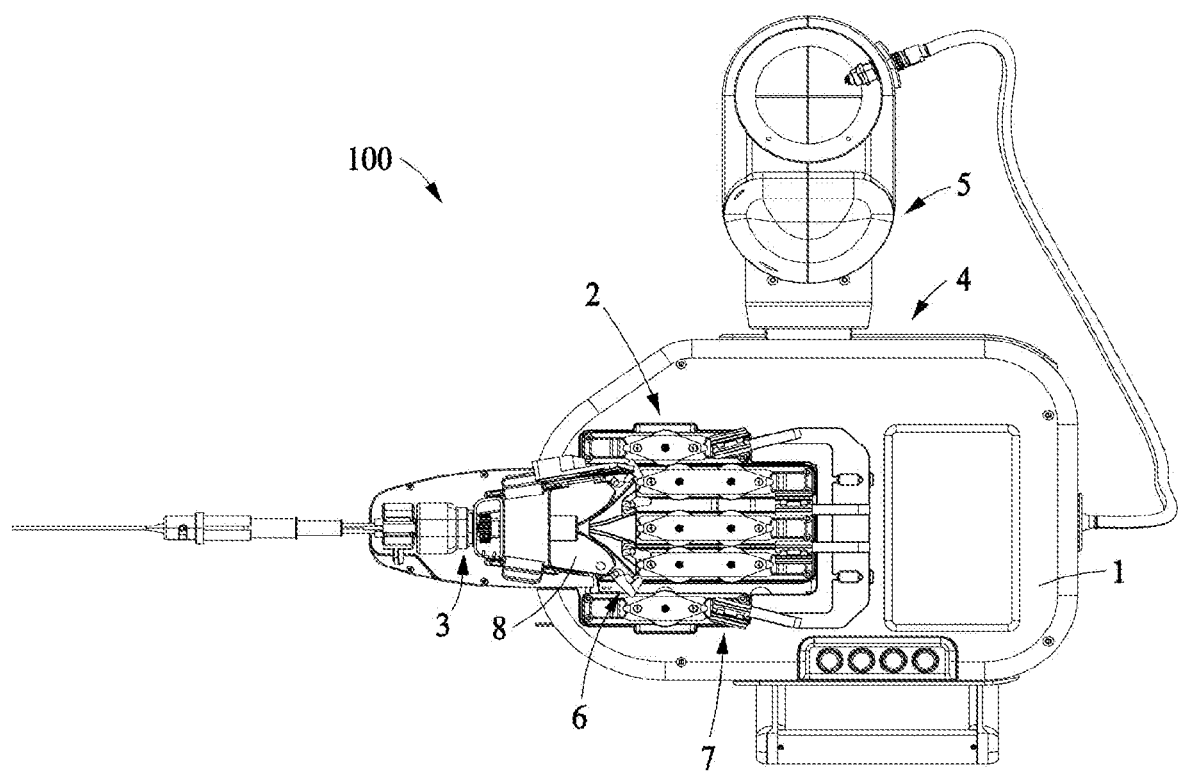
FIG. 2 is a plan view illustrating a surgical tool control apparatus according to an embodiment.
Figure 3:
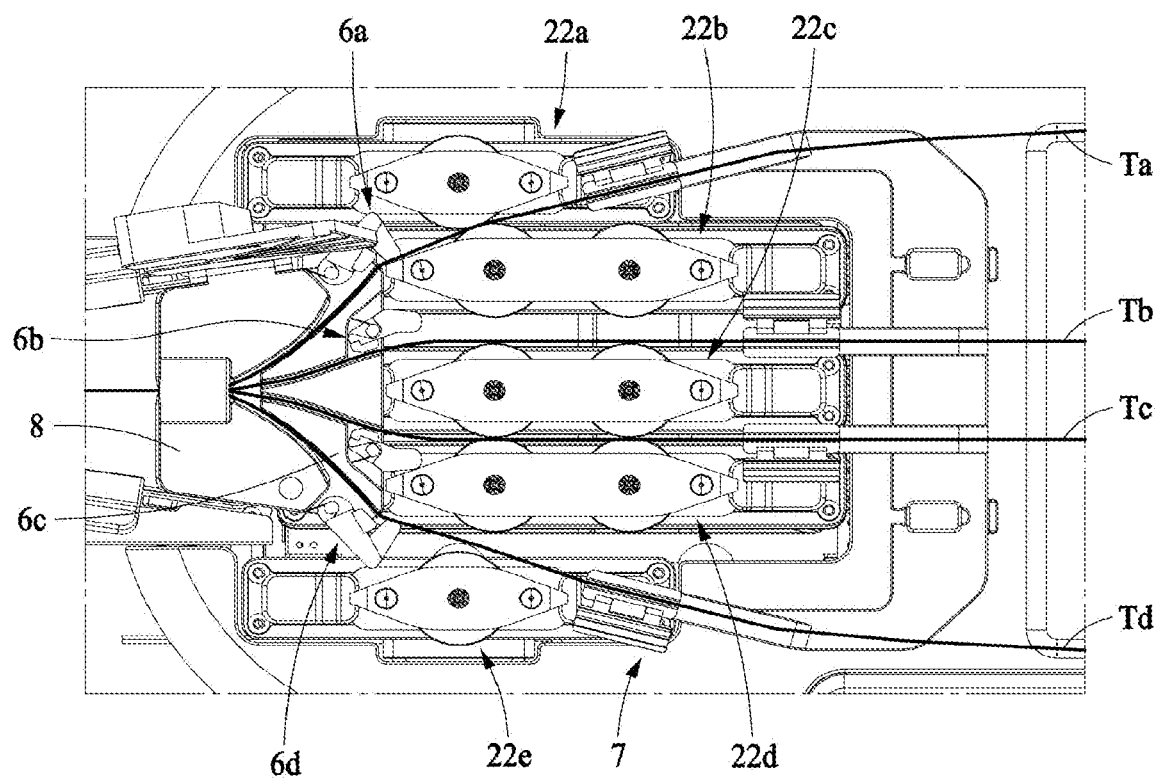
FIG. 3 is a perspective view illustrating a surgical tool control apparatus according to an embodiment.
Figure 4:
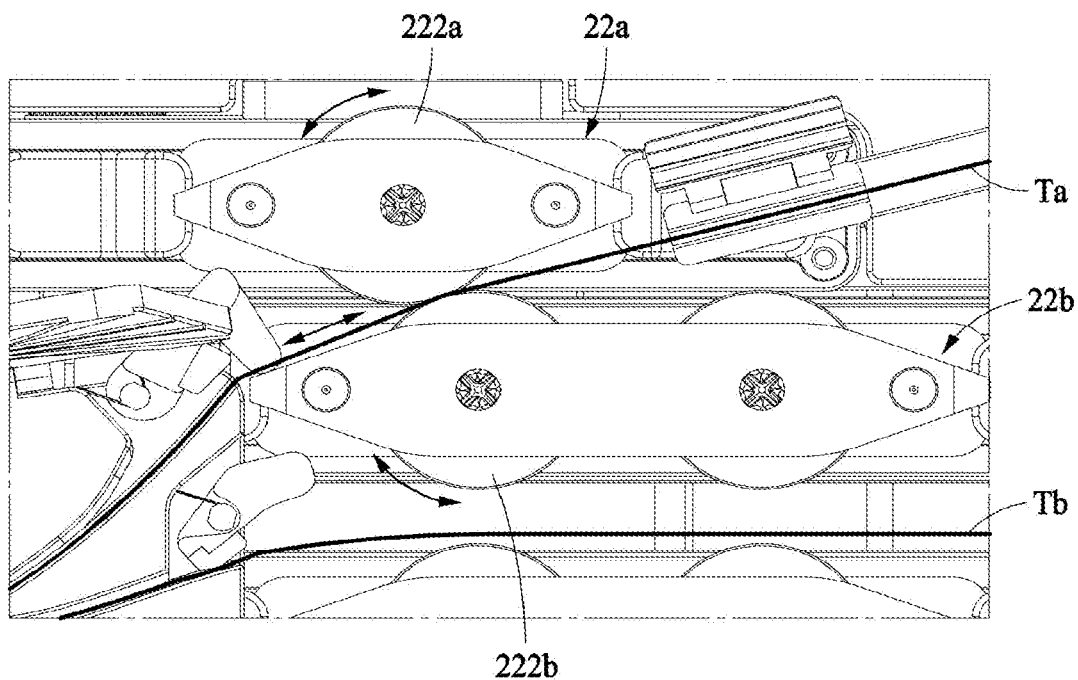
FIG. 4 illustrates a process in which a roller module of a surgical tool control apparatus moves a surgical tool forward and backward according to an embodiment.
Figure 5:
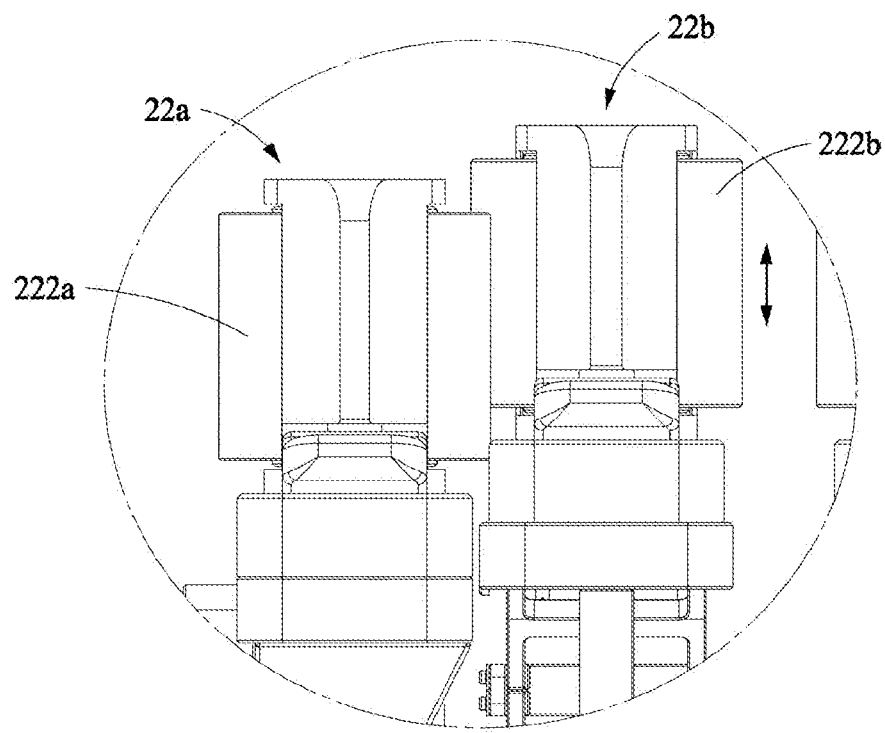
FIG. 5 illustrates a process in which a roller module of a surgical tool control apparatus rotates a surgical tool according to an embodiment.

FIG. 1 is a perspective view illustrating a surgical tool control apparatus according to an embodiment. FIG. 2 is a plan view illustrating a surgical tool control apparatus according to an embodiment. FIG. 3 is a perspective view illustrating a surgical tool control apparatus according to an embodiment. FIG. 4 illustrates a process in which a roller module of a surgical tool control apparatus moves a surgical tool forward and backward according to an embodiment. FIG. 5 illustrates a process in which a roller module of a surgical tool control apparatus rotates a surgical tool according to an embodiment.

Referring to FIGS. 1 to 5, a surgical tool control apparatus 100 may independently control a plurality of surgical tools T. Here, the surgical tool T may refer to a surgical tool having a longitudinal direction. For example, the surgical tool T may include various surgical tools, such as a guide wire and a balloon catheter having a longitudinal direction. The surgical tool control apparatus 100 may move the surgical tool T forward and backward and rotate the surgical tool T through the rotation and vertical movement of a roller module 22 which will be described below. Specifically, as shown in FIG. 4, in a state in which a first roller module 22a and a second roller module 22b are positioned adjacent to each other to grip a first surgical tool Ta therebetween, each of roller members 222a and 222b rotates in one direction or the other direction, thereby moving the first surgical tool Ta gripped therebetween forward or backward along the longitudinal direction. In addition, as shown in FIG. 5, in a state in which the first roller module 22a and the second roller module 22b are positioned adjacent to each other to grip the surgical tool therebetween, at least one roller module 22 moves in a vertical direction, thereby rotating the surgical tool gripped therebetween.

Referring to FIG. 3, the surgical tool control apparatus 100 may independently control four surgical tools Ta, Tb, Tc, and Td through five roller modules 22a, 22b, 22c, 22d, and 22e. The surgical tool control apparatus 100 may grip or release the surgical tool T between the roller modules 22 through the horizontal movement of the roller modules 22. For example, FIG. 3 shows a state in which the first surgical tool Ta is gripped by the first roller module 22a and the second roller module 22b and a third surgical tool Tc is gripped by the third roller module 22c and the fourth roller module 22d. A method of gripping the surgical tool will be described below in more detail.

The surgical tool control apparatus 100 according to an embodiment may include a housing 1, a control assembly 2, a guide catheter rotating portion 3, a housing translational movement portion 4, a housing tilting portion 5, a clamping portion 6, a surgical tool supporter 7, and a Y connector holder 8.

Referring to FIGS. 1 and 2, the housing 1 may form a housing of the surgical tool control apparatus 100. For example, the housing 1 may be connected to a robot arm of a slave base. That is, the surgical tool control apparatus 100 may function as an end effector connected to the robot arm of the slave base. The housing 1 may be provided with a switch or a knob for position adjustment and tilting of the housing 1. The housing 1 may include a display panel to show a user how to use the apparatus and to notify information on a state of the apparatus or the like.

Figure 6:
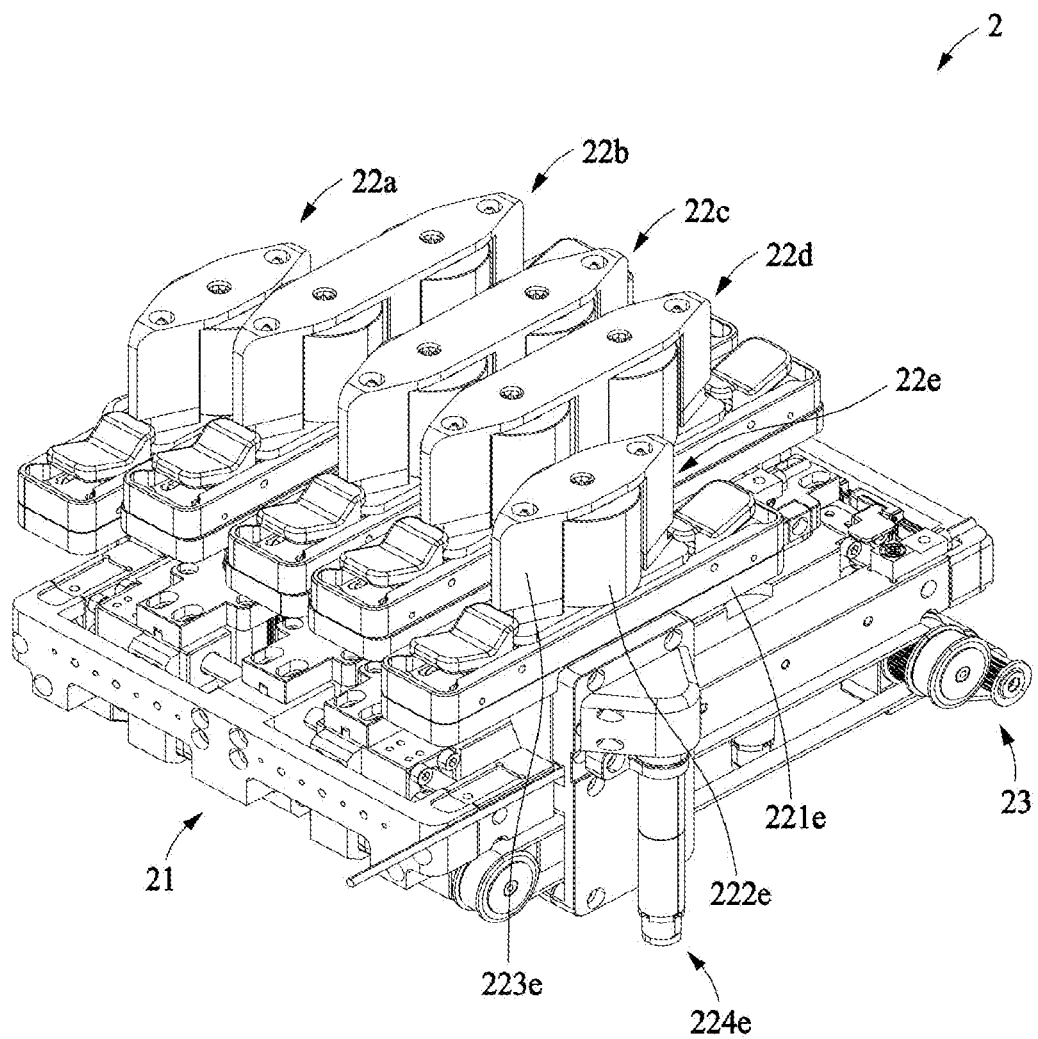
FIG. 6 is a perspective view illustrating a control assembly according to an embodiment.
Figure 7:
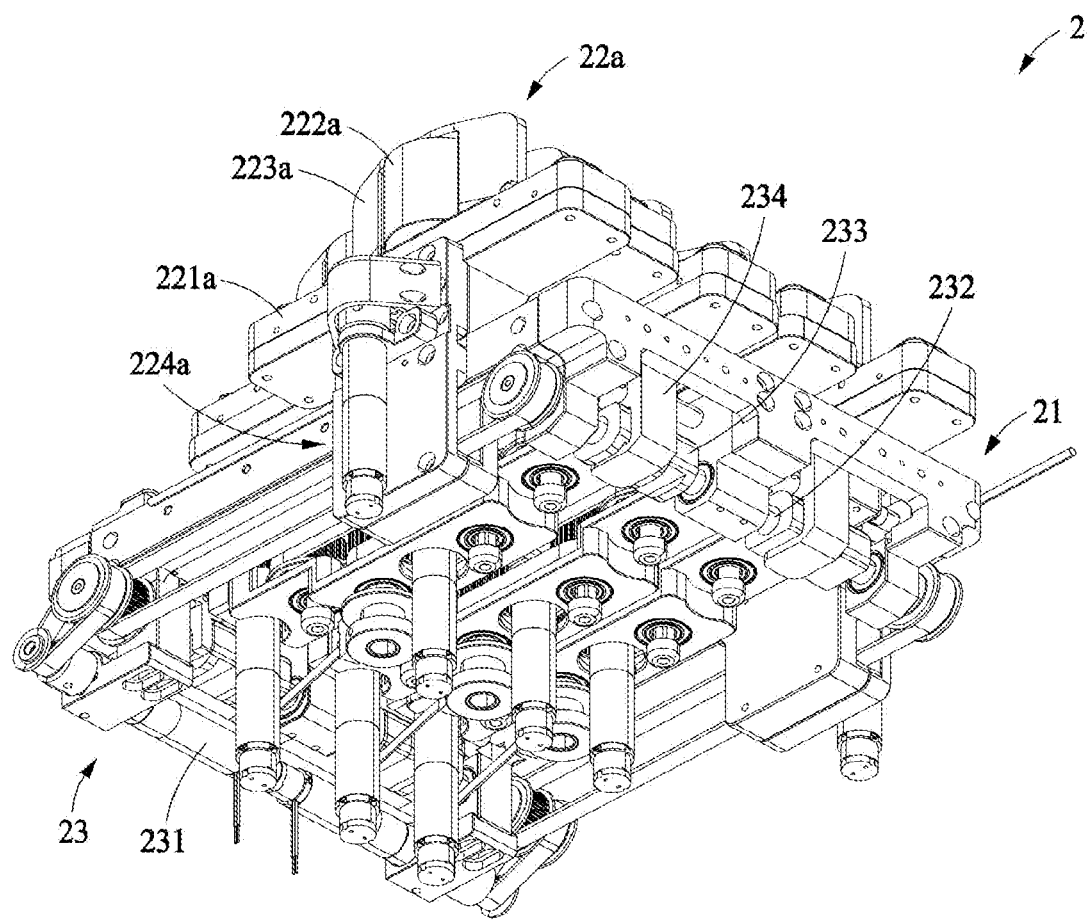
FIG. 7 is a perspective view illustrating a bottom portion of a control assembly according to an embodiment.
Figure 8:
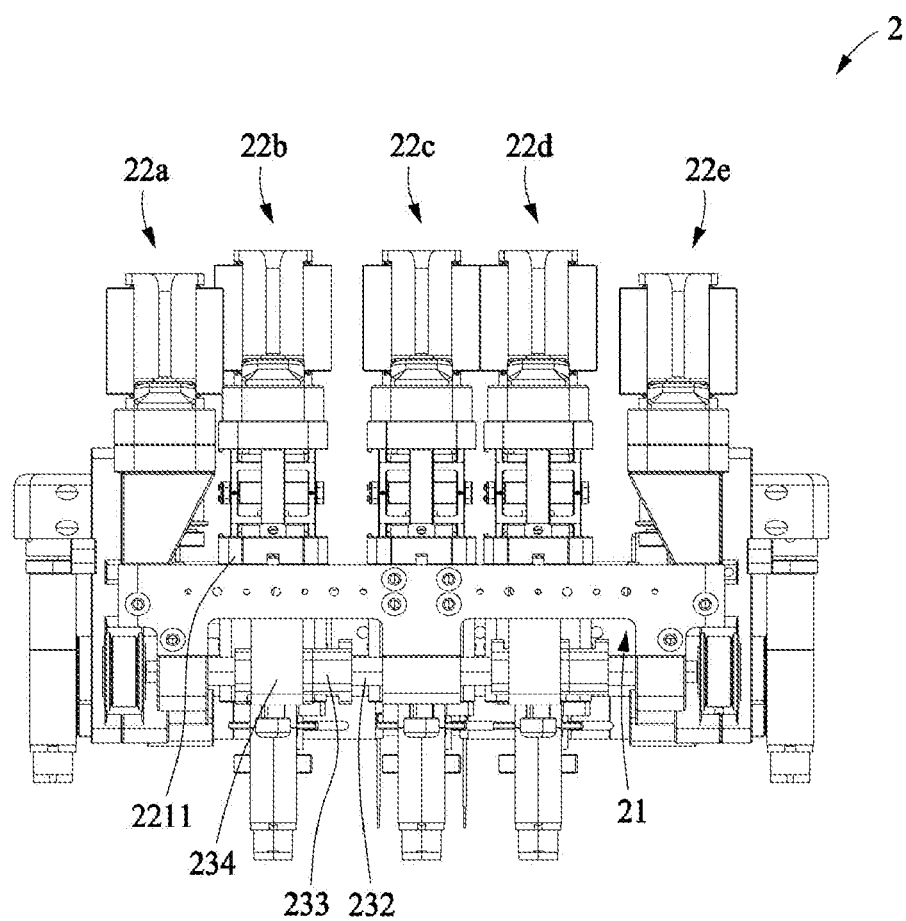
FIG. 8 is a front view illustrating a control assembly according to an embodiment.
Figure 9:
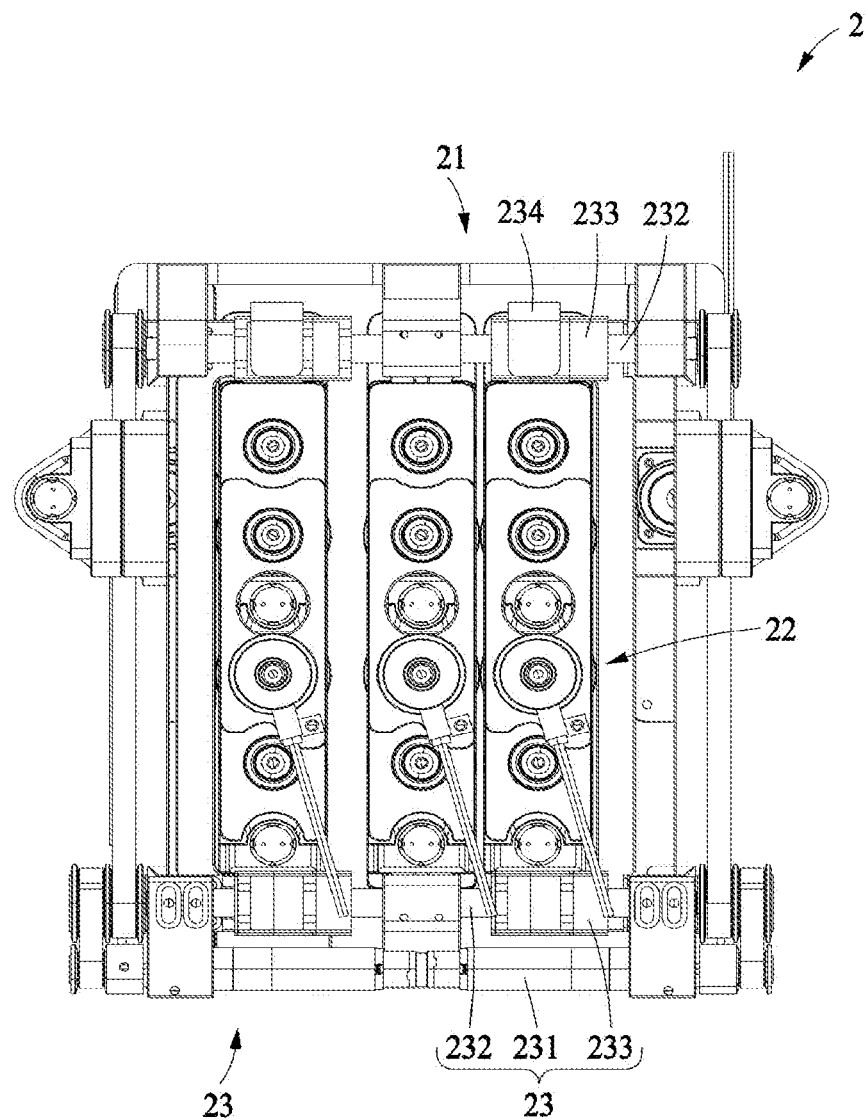
FIG. 9 is a bottom view illustrating a control assembly according to an embodiment.

FIG. 6 is a perspective view illustrating a control assembly according to an embodiment. FIG. 7 is a perspective view illustrating a bottom portion of a control assembly according to an embodiment. FIG. 8 is a front view illustrating a control assembly according to an embodiment. FIG. 9 is a bottom view illustrating a control assembly according to an embodiment.

Referring to FIGS. 3 and 6 to 9, the control assembly 2 may grip or release the surgical tool T. The control assembly 2 may move the gripped surgical tool T in the longitudinal direction or rotate the gripped surgical tool T.

The control assembly 2 may include a frame 21, the roller module 22, and a horizontal movement portion 23.

The frame 21 may form a base frame on which the roller module 22 and the horizontal movement portion 23, which will be described below, are installed. That is, the frame 21 may be connected to the housing 1, and the frame 21 may be connected to the roller module 22 and the horizontal movement portion 23.

A plurality of roller modules 22 may be provided and connected to the frame 21. For example, the roller module 22 may include the first roller module 22a, the second roller module 22b, the third roller module 22c, the fourth roller module 22d, and the fifth roller module 22e. The first roller module 22a, the second roller module 22b, the third roller module 22c, the fourth roller module 22d, and the fifth roller module 22e may be arranged side by side with each other. Meanwhile, this is merely an example, and the number of roller modules 22 is not limited thereto.

The surgical tool T may be gripped between two adjacent roller modules 22. For this, at least one roller module 22 may be horizontally movable with respect to another roller module 22. For example, as shown in FIG. 3, the second roller module 22b may be horizontally movable with respect to the first roller module 22a so that the first surgical tool Ta is gripped between the first roller module 22a and the second roller module 22b. In this case, the second surgical tool Tb positioned between the second roller module 22b and the third roller module 22c may be released. Also, on the contrary, the second roller module 22b may be horizontally movable with respect to the third roller module 22c so that the second surgical tool Tb is gripped between the second roller module 22b and the third roller module 22c. In this case, the first surgical tool Ta positioned between the first roller module 22*a* and the second roller module 22*b* may be released.

Similarly, the fourth roller module 22*d* may be horizontally movable with respect to the third roller module 22*c* so that the third surgical tool Tc is gripped between the third roller module 22*c* and the fourth roller module 22*d*. In this case, the fourth surgical tool Td positioned between the fourth roller module 22*a* and the fifth roller module 22*e* may be released. Also, on the contrary, the fourth roller module 22*d* may be horizontally movable with respect to the fifth roller module 22*e* so that the fourth surgical tool Td is gripped between the fourth roller module 22*d* and the fifth roller module 22*e*. In this case, the third surgical tool Tc positioned between the third roller module 22*c* and the fourth roller module 22*d* may be released.

As described above, each surgical tool T may be selectively gripped according to the structure in which the movable roller module 22 is horizontally movable between the roller modules 22 positioned on both sides with respect to the roller modules 22 on both sides. In addition, the roller modules 22 may spread to have a sufficient distance therebetween to load the surgical tool T, and thus, a thickness of the surgical tool T, that may be gripped, may not be limited. That is, the versatility of the surgical tool control apparatus 100 may be improved in that the thickness of the surgical tool T is not limited and the surgical tool T having any thickness may be applied and gripped.

As shown in FIG. 3, in a state in which the first roller module 22*a* and the second roller module 22*b* grip the first surgical tool Ta and the third roller module 22*c* and the fourth roller module 22*d* grip the third surgical tool Tc, the first surgical tool Ta and the third surgical tool Tc may be independently controlled (moved forward and backward and rotated), respectively. Specifically, the first surgical tool Ta may move forward or backward in the longitudinal direction by the rotation of the respective roller members 222*a* and 222*b* of the first roller module 22*a* and the second roller module 22*b* (see FIG. 4). In addition, the first surgical tool Ta may rotate by the vertical movement of one of the respective roller members 222*a* and 222*b* of the first roller module 22*a* and the second roller module 22*b* (see FIG. 5). Similarly, the third surgical tool Tc may move forward or backward in the longitudinal direction by the rotation of the respective roller members 222*c* and 222*d* of the third roller module 22*c* and the fourth roller module 22*d*. In addition, the third surgical tool Tc may rotate by the vertical movement of one of the respective roller members 222*c* and 222*d* of the third roller module 22*c* and the fourth roller module 22*d*. In summary, the first surgical tool Ta may be controlled by the first roller module 22*a* and the second roller module 22*b*, and the third surgical tool Tc may be controlled by the third roller module 22*c* and the fourth roller module 22*d*. Accordingly, the first surgical tool Ta and the third surgical tool Tc, as a set, may be controlled independently of each other at the same time. In this case, for example, one of the first surgical tool Ta and the third surgical tool Tc may be a balloon catheter and the other one thereof may be a guide wire.

Similarly, in a state in which the second roller module 22*b* and the third roller module 22*c* grip the second surgical tool Tb and the fourth roller module 22*d* and the fifth roller module 22*e* grip the fourth surgical tool Td, the second surgical tool Tb and the fourth surgical tool Td may be independently controlled (moved forward and backward and rotated), respectively. In order to avoid repetitive description, the above description is used for the details of the control of the second surgical tool Tb and the fourth surgical tool Td. According to such a structure, the second surgical tool Tb may be controlled by the second roller module 22*b* and the third roller module 22*c*, and the fourth surgical tool Td may be controlled by the fourth roller module 22*d* and the fifth roller module 22*e*. Accordingly, the second surgical tool Tb and the fourth surgical tool Td, as another set, may be controlled independently of each other at the same time. In this case, for example, one of the second surgical tool Tb and the fourth surgical tool Td may be a balloon catheter and the other one thereof may be a guide wire.

As a result, the surgical tool control apparatus 100 may set the first surgical tool Ta and the third surgical tool Tc as one set and the second surgical tool Tb and the fourth surgical tool Td as another set, and independently control the two sets, respectively. Accordingly, the surgical tool control apparatus 100 may be easily applied to complicated interventional procedures requiring a plurality of surgical tools.

Meanwhile, the arrangement of the sets of the surgical tools described above is merely an example, and the surgical tools may be arranged as sets in various ways by changing horizontal positions of the roller modules 22, if necessary. In addition, although it has been described that the second roller module 22*b* and the fourth roller module 22*d* move horizontally between the roller modules 22*a*, 22*c*, and 22*e* positioned on both sides, this is merely an example, and the first roller module 22*a*, the third roller module 22*c*, and the fifth roller module 22*e* may also be configured to be movable horizontally.

Figure 10:
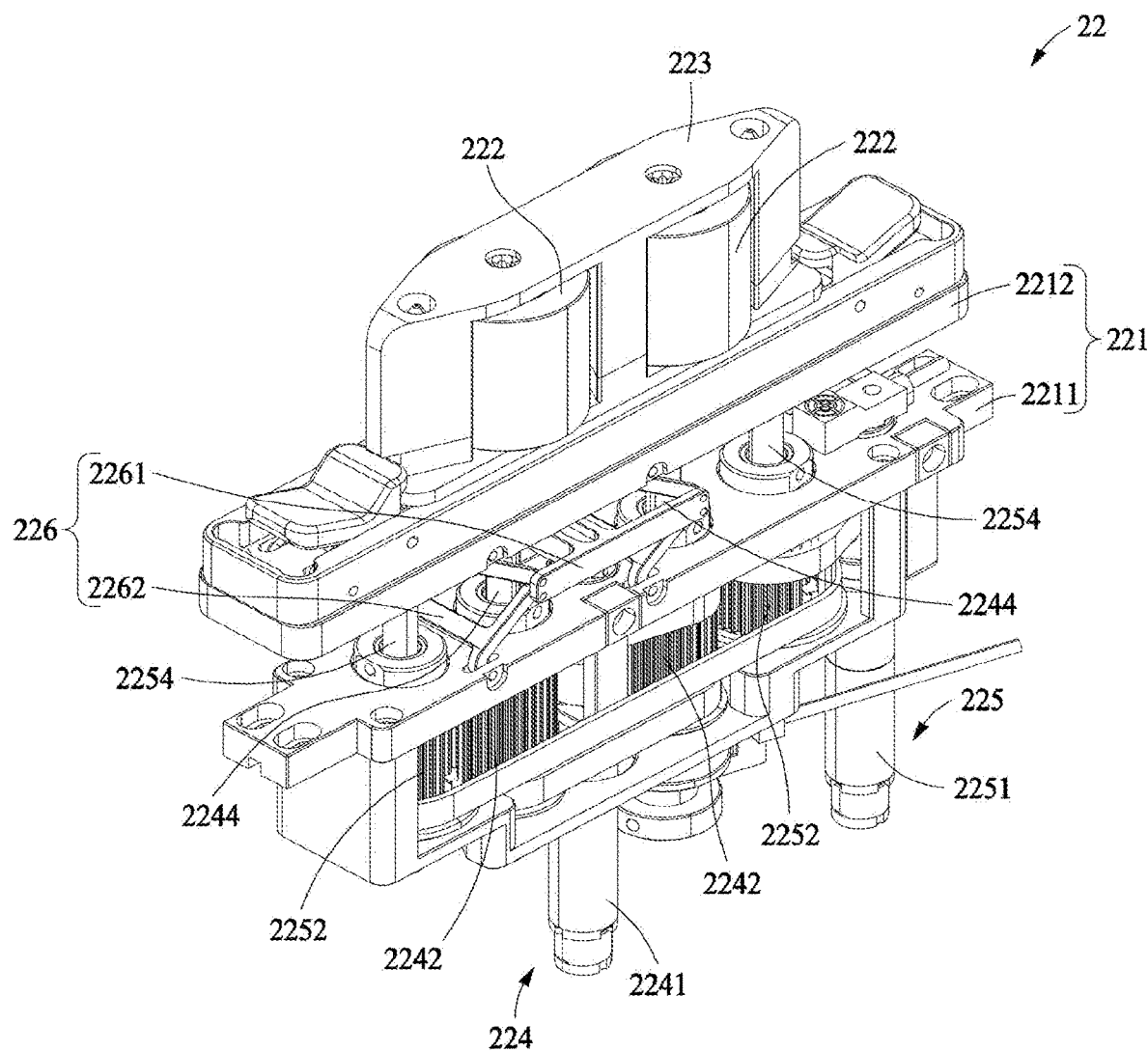
FIG. 10 is a perspective view illustrating a roller module according to an embodiment.
Figure 11:
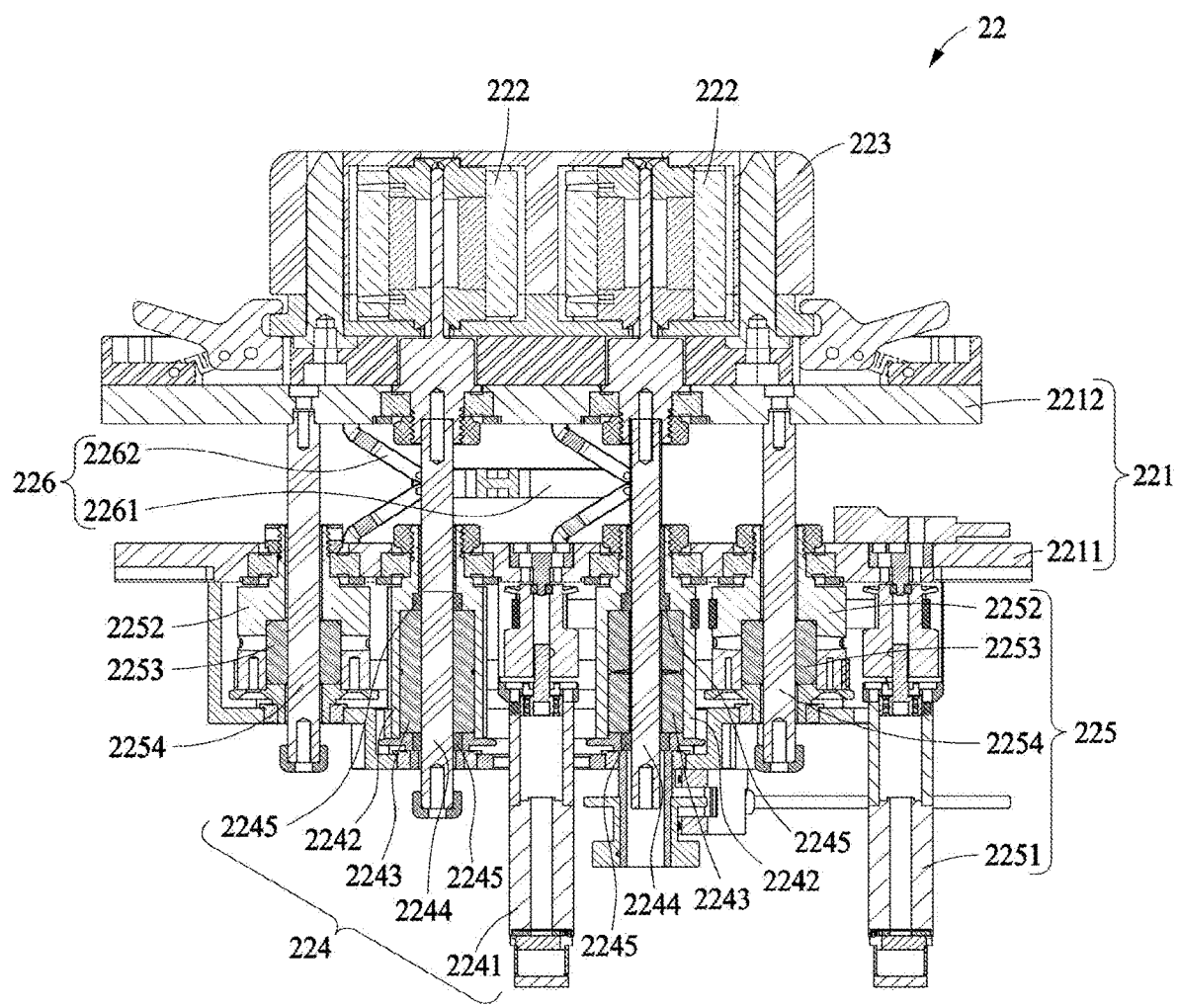
FIG. 11 is a cross-sectional view illustrating a roller module according to an embodiment.

FIG. 10 is a perspective view illustrating a roller module according to an embodiment. FIG. 11 is a cross-sectional view illustrating a roller module according to an embodiment.

The roller module 22 shown in FIGS. 10 and 11 may be a roller module in which the roller member 222 is formed to be movable in the vertical direction. For example, as shown in FIG. 6, the second roller module 22*b*, the third roller module 22*c*, and the fourth roller module 22*d* may be formed as the roller module 22 shown in FIGS. 10 and 11.

The roller module 22 shown in FIGS. 10 and 11 may include a roller plate 221, the roller member 222, a roller housing 223, a rotation driving portion 224, a vertical movement portion 225, and a link structure support 226.

The roller plate 221 may be connected to the frame 21. That is, the roller plate 221 may perform a function of connecting the roller module 22 to the frame 21. The roller member 222 may be rotatably connected to the roller plate 221.

The roller plate 221 may include a lower roller plate 2211 and an upper roller plate 2212. The lower roller plate 2211 may be a portion connected to the frame 21. The lower roller plate 2211 may be provided with the rotation driving portion 224 and the vertical movement portion 225 which will be described below. The upper roller plate 2212 may be positioned above the lower roller plate 2211 and may be a portion to which the roller member 222 is rotatably connected. The upper roller plate 2212 may be moved vertically with respect to the lower roller plate 2211 by the vertical movement portion 225 which will be described below.

The roller member 222 may be rotatably connected to the upper roller plate 2212. A rotation axis of the roller member 222 may be perpendicular to the upper roller plate 2212. A pair of roller members 222 may be provided, and may be spaced apart from each other along the longitudinal direction of the upper roller plate 2212.

The roller housing 223 may be connected to an upper side of the upper roller plate 2212 and provide a space in which the roller members 222 rotate. For example, the roller housing 223 may be engaged with the upper roller plate 2212 using a latch.

The rotation driving portion 224 may rotate the roller members 222 with respect to the roller plate 221. The rotation driving portion 224 may rotate the roller members 222 in one direction or the other direction. The rotation driving portion 224 may be installed on the lower roller plate 2211.

The rotation driving portion 224 may include a rotation driving motor 2241, a rotation drive pulley 2242, a spline nut 2243, a spline shaft 2244, and a shaft support 2245.

The rotation driving motor 2241 may generate rotational power for rotating the roller members 222. The rotation driving motor 2241 may be a motor that implements the rotation in one direction and the other direction. The rotation drive pulley 2242 may receive the rotational power from the rotation driving motor 2241. For example, the rotation drive pulley 2242 may receive the rotational power through a timing belt or the like. The number of rotation drive pulleys 2242 may correspond to the number of roller members 222. For example, a pair of rotation drive pulleys 2242 may be provided. A pair of rotation drive pulleys 2242 may be connected with a timing belt or the like to transmit the rotational power to each other.

The spline nut 2243 may rotate integrally with the rotation drive pulley 2242. For example, the spline nut 2243 may be positioned inside the rotation drive pulley 2242. The spline shaft 2244 may be engaged with the spline nut 2243. The spline shaft 2244 may be rotated integrally with the spline nut 2243. The roller member 222 may be connected to one side of the spline shaft 2244. According to such a structure, the roller member 222 connected to one side of the spline shaft 2244 may be rotated in accordance with the rotation of the spline nut 2243.

That is, in summary, the rotation driving motor 2241 may rotate the rotation drive pulley 2242 through a timing belt or the like, the spline nut 2243 and the spline shaft 2244 may integrally rotate as the rotation drive pulley 2242 rotates, and accordingly, the roller member 222 connected to the spline shaft 2244 may rotate.

Meanwhile, since the roller member 222 moves in the vertical direction by the vertical movement portion 225, it may be important to prevent the spline shaft 2244 from shaking. For this, the shaft support 2245 may be positioned between the rotation drive pulley 2242 and the spline shaft 2244. For example, the shaft support 2245 may be connected to the rotation drive pulley 2242 and the spline shaft 2244 to fit thereto to fill an empty space between the rotation drive pulley 2242 and the spline shaft 2244. For example, the shaft support 2245 may fill empty spaces formed on upper and lower sides of the spline nut 2243 in the inner space of the rotation drive pulley 2242. In this way, as the shaft support 2245 is positioned between the rotation drive pulley 2242 and the spline shaft 2244, it is possible to prevent the spline shaft 2244 from shaking. For example, as the shaft support 2245 has a flange shape, a supporting force may be improved. In order to prevent a jam due to thermal expansion during operations, the shaft support 2245 may be desirably formed to have an inner diameter tolerance of +0.0005 millimeters (mm) to +0.01 mm after assembly. For example, the shaft support 2245 may include a Teflon or acetal material.

The vertical movement portion 225 may vertically move the upper roller plate 2212 with respect to the lower roller plate 2211. That is, the vertical movement portion 225 may vertically move the upper roller plate 2212 to vertically move the roller member 222. The vertical movement portion 225 may be installed on the lower roller plate 2211.

The vertical movement portion 225 may include a vertical movement driving motor 2251, a vertical movement pulley 2252, a vertical movement lead screw nut 2253, and a vertical movement lead screw 2255.

The vertical movement driving motor 2251 may generate rotational power for vertically moving the roller member 222. The vertical movement driving motor 2251 may be a motor that implements the rotation in one direction and the other direction. The vertical movement pulley 2252 may receive the rotational power from the vertical movement driving motor 2251. For example, the vertical movement drive pulley 2252 may receive the rotational power through a timing belt or the like. A pair of vertical movement pulleys 2252 may be provided. For example, a pair of vertical movement pulleys 2252 may be disposed to be spaced apart from each other on one side and the other side of the lower roller plate 2211, respectively. The pair of vertical movement pulleys 2252 may be connected with a timing belt or the like to transmit the rotational power to each other.

The vertical movement screw nut 2253 may rotate integrally with the vertical movement pulley 2252. For example, the vertical movement screw nut 2253 may be disposed inside the vertical movement pulley 2252. The vertical movement lead screw 2254 may be engaged with the vertical movement screw nut 2253. The vertical movement screw 2254 may be moved in the longitudinal direction in accordance with the rotation of the vertical movement screw nut 2253. The upper roller plate 2212 may be connected to one side of the vertical movement screw 2254. According to such a structure, the vertical movement screw 2254 may vertically move the upper roller plate 2212 in accordance with the rotation of the vertical movement screw nut 2253.

That is, in summary, the vertical movement driving motor 2251 may rotate the vertical movement pulley 2252 and the vertical movement lead screw nut 2253 integrally through a timing belt or the like, and the vertical movement lead screw 2254 may vertically move the roller member 222 connected to the upper roller plate 2212, as the vertical movement lead screw 2254 moves in the longitudinal direction in accordance with the rotation of the vertical movement lead screw nut 2253.

The spacing between the lower roller plate 2211 and the upper roller plate 2212 may increase due to the vertical movement portion 225, and therefore, it may be important to prevent a problem regarding tilting of the upper roller plate 2212 with respect to the lower roller plate 2211, that is, a problem of wobble of the axis of the spline shaft 2244. For this, the link structure support 226 may support the upper roller plate 2212 with respect to the lower roller plate 2211. Since a spacing distance of the upper roller plate 2212 from the lower roller plate 2211 may be changed, the link structure support 226 may have a link structure with a length which is changeable in the vertical direction in response to the spacing distance between the lower roller plate 2211 and the upper roller plate 2212. For example, the link structure support 226 may have a structure such as a pantagraph. For example, the link structure support 226 may include a link frame 2261 and a link 2262. The link frame 2261 may be positioned between the lower roller plate 2211 and the upper roller plate 2212. The link 2262 may connect both sides of the link frame 2261 to the lower roller plate 2211 and the upper roller plate 2212, respectively. The link 2262 may be rotatably connected to both sides of the link frame 2261, the lower roller plate 2211, and the upper roller plate 2212, respectively, so that a length of the link structure support 226 in the vertical direction is changed. According to such a structure, the link structure support 226 is positioned between the lower roller plate 2211 and the upper roller plate 2212 and has a length changeable in the vertical direction in response to a change of the spacing distance therebetween, while supporting both sides of the upper roller plate 2212 with respect to the lower roller plate 2211. Accordingly, it is possible to prevent a problem regarding tilting of the upper roller plate 2212 with respect to the lower roller plate 2211, that is, a problem of wobble of the axis of the spline shaft 2244.

Meanwhile, referring to FIG. 6, the first roller module 22*a* and the fifth roller module 22*e* may include roller plates 221*a* and 221*e*, roller members 222*a* and 222*e*, roller housings 223*a* and 223*e*, and rotation driving portions 224*a* and 224*e*, respectively. The first roller module 22*a* and the fifth roller module 22*e* may be formed as roller modules that do not move in the vertical direction. The roller plates 221*a* and 221*e* of the first roller module 22*a* and the fifth roller module 22*e* may be formed as single plates to be directly connected to the frame 21, and may not include a separate vertical movement portion and link structure support. In addition, the first roller module 22*a* and the fifth roller module 22*e* may include one of the roller members 222*a* and 222*e*, respectively. However, this is merely an example, and the first roller module 22*a* and the fifth roller module 22*e* may also be formed as the roller modules shown in FIGS. 10 and 11.

Referring back to FIGS. 6 to 9, the horizontal movement portion 23 may move the roller module 22 in a horizontal direction. For example, in the case of FIGS. 6 to 9, the horizontal movement portion 23 may move the second roller module 22*b* and the fourth roller module 22*d* in the horizontal direction. However, this is merely an example, and the first roller module 22*a*, the third roller module 22*c*, and the fifth roller module 22*e* may also be formed to be movable in the horizontal direction. The number of horizontal movement portions 23 may correspond to the number of roller modules 22 desired to be moved. The horizontal movement portion 23 may be installed on the frame 21.

The horizontal movement portion 23 may include a horizontal movement driving motor 231, a horizontal movement lead screw 232, a horizontal movement lead screw nut 233, and a connecting member 234.

The horizontal movement driving motor 231 may generate rotational power for horizontally moving the roller module 22. The horizontal movement driving motor 231 may be a motor that implements the rotation in one direction and the other direction.

The horizontal movement lead screw 232 may be connected to the frame 21 in the horizontal direction. The horizontal movement lead screw 232 may receive the rotational power from the horizontal movement driving motor 231 through a timing belt, a pulley, or the like. A pair of horizontal movement lead screws 232 may be provided. For example, a pair of horizontal movement lead screws 232 may be disposed on one side and the other side of the frame 21, respectively. The pair of horizontal movement lead screws 232 may be connected with a timing belt, a pulley, or the like to transmit the rotational power to each other.

The horizontal movement lead screw nut 233 may be engaged with the horizontal movement lead screw 232. One side of the horizontal movement lead screw nut 233 may be connected to the roller plate 221. For example, the horizontal movement lead screw nut 233 may be connected to the lower roller plate 2211 through the connecting member 234. A pair of horizontal movement lead screw nuts 233 may be connected to one side and the other side of the lower roller plate 2211, respectively. According to such a structure, since the horizontal movement lead screw nut 233 moves in the longitudinal direction of the horizontal movement lead screw 232 in accordance with the rotation of the horizontal movement lead screw 232, the roller plate 221 connected to the horizontal movement lead screw nut 233 may move in the horizontal direction.

That is, in summary, the horizontal movement driving motor 231 may rotate the horizontal movement lead screw 232 through a timing belt, a pulley, or the like, and the horizontal movement lead screw nut 233 and the lower roller plate 2211 connected thereto may horizontally move along the longitudinal direction of the horizontal movement lead screw 232 in accordance with the rotation of the horizontal movement lead screw 232, that is, the roller module 22 may move in the horizontal direction.

Figure 12:
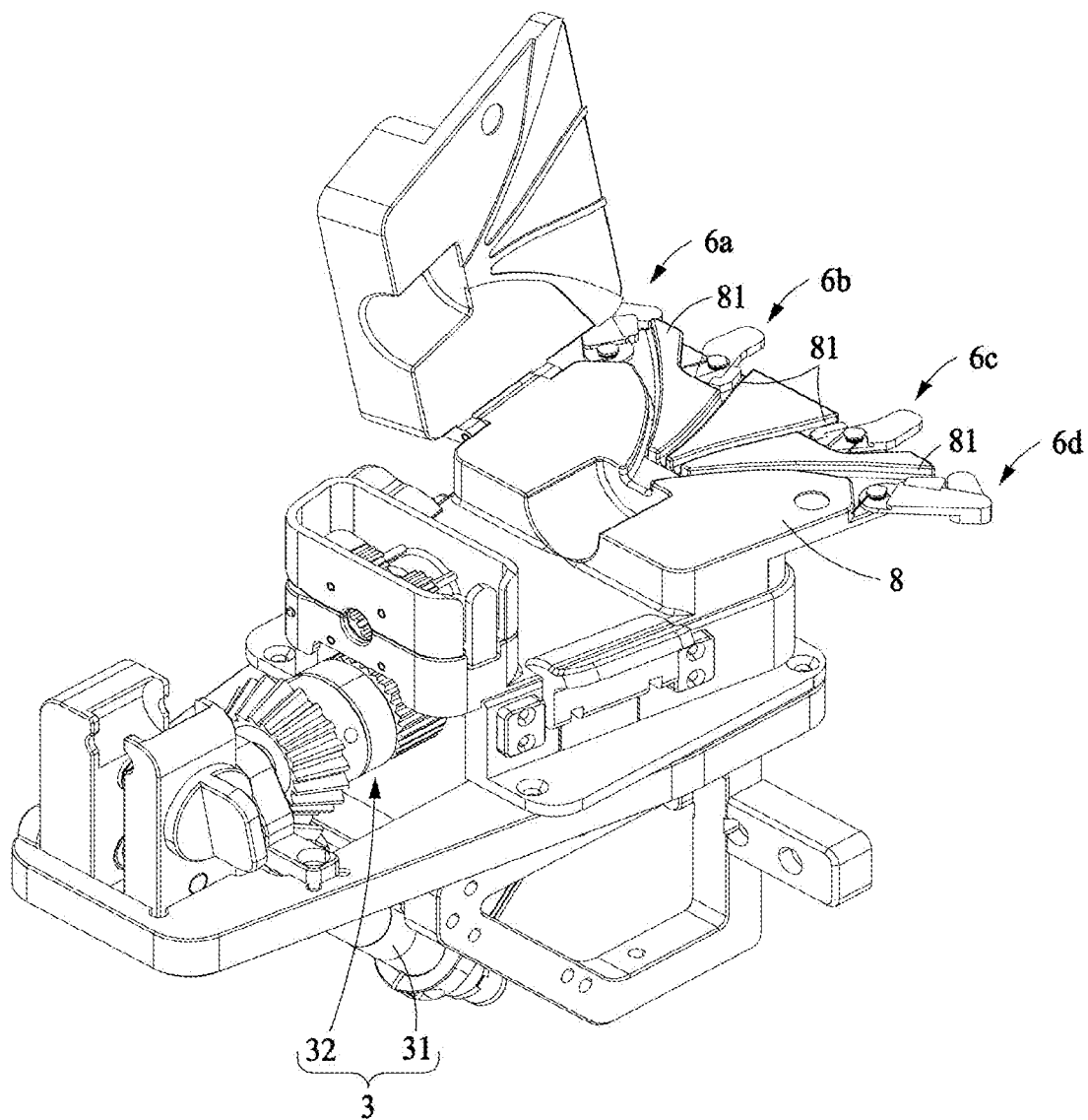
FIG. 12 is a perspective view of a guide catheter rotating portion according to an embodiment.

FIG. 12 is a perspective view of a guide catheter rotating portion according to an embodiment.

Referring to FIGS. 1, 2 and 12, the guide catheter rotating portion 3 may rotate a guide catheter connected to a front end of the surgical tool control apparatus 100. The guide catheter rotating portion 3 may be provided at a front end portion of the housing 1.

The guide catheter rotating portion 3 may include a guide catheter rotation driving motor 31 and a guide catheter rotation pulley assembly 32. The guide catheter rotation driving motor 31 may generate rotational power for rotating a guide catheter. The guide catheter rotation pulley assembly 32 may receive the rotational power from the guide catheter rotation driving motor 31. The guide catheter rotation pulley assembly 32 may transmit the received rotational power to the guide catheter. For example, the guide catheter rotation pulley assembly 32 may transmit the rotational power to a Y connector connected to a guide catheter, thereby rotating the guide catheter. For this, a pulley may be formed at an end portion of the Y connector to receive the rotational power from the guide catheter rotation pulley assembly 32.

Figure 13:
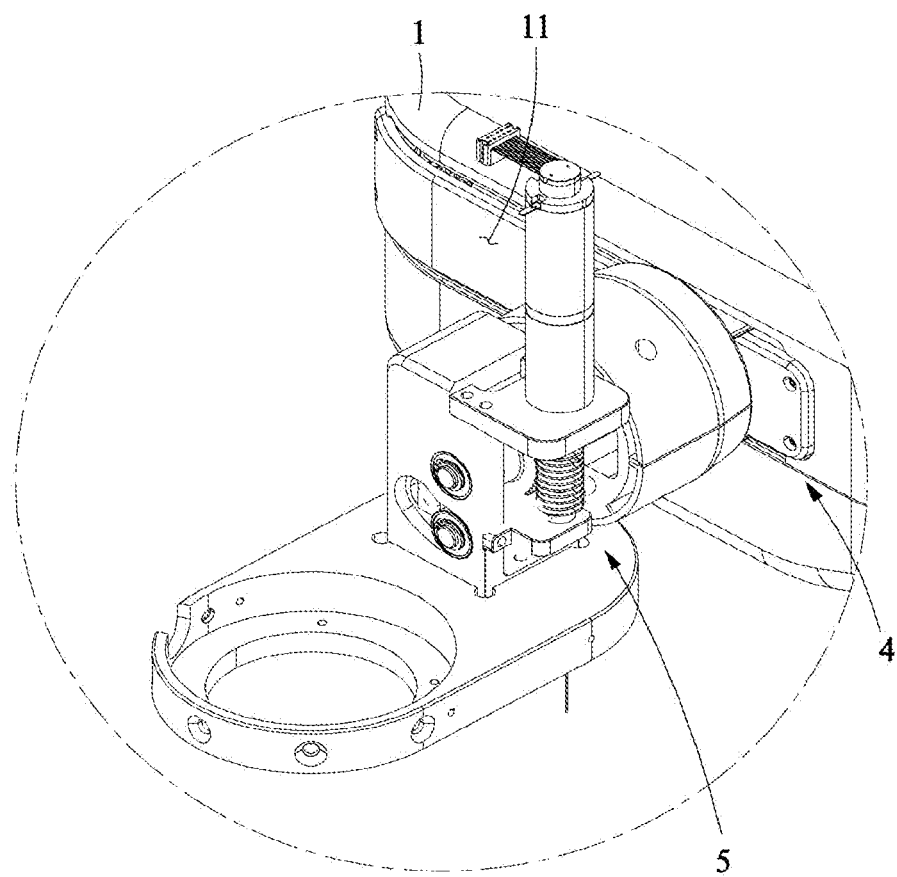
FIG. 13 is a perspective view of a housing translational movement portion and a housing tilting portion and illustrates a state in which the housing translational movement portion and the housing tilting portion are connected to a housing according to an embodiment.
Figure 14:
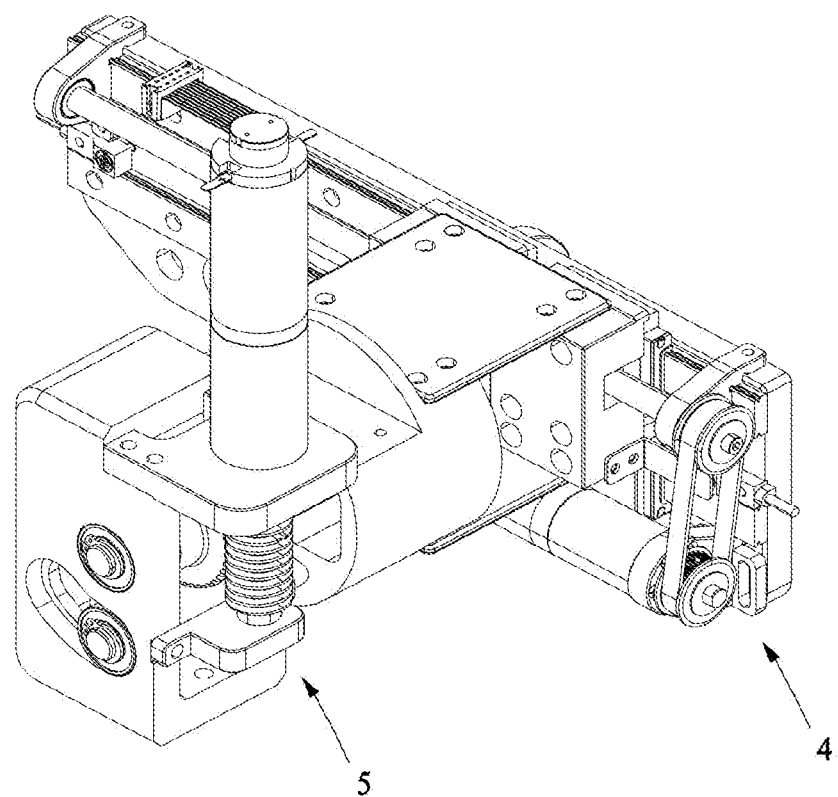
FIG. 14 is a perspective view of a housing translational movement portion and a housing tilting portion according to an embodiment.

FIG. 13 is a perspective view of a housing translational movement portion and a housing tilting portion and illustrates a state in which the housing translational movement portion and the housing tilting portion are connected to a housing according to an embodiment. FIG. 14 is a perspective view of a housing translational movement portion and a housing tilting portion according to an embodiment.

Referring to FIGS. 13 and 14, a housing translational movement portion 4 may move the housing 1 forward or backward with respect to a position where the surgical tool control apparatus 100 is installed (e.g., a robot arm). According to such driving, the housing translational movement portion 4 may move a guide catheter connected to a front end of the surgical tool control apparatus 100 forward or backward. As shown in FIG. 14, the housing translational movement portion 4 may translate the housing 1 to a position where the surgical tool control apparatus 100 is installed (e.g., a robot arm) through the configuration of a motor, pulley, timing belt, lead screw, lead screw nut, and the like. For this, a slit 11 providing a path for the translational movement may be formed in the housing 1.

The housing tilting portion 5 may tilt the housing 1 with respect to a position where the surgical tool control apparatus 100 is installed (e.g., a robot arm). As shown in FIG. 14, the housing tilting portion 5 may tilt the housing 1 with respect to a position where the surgical tool control apparatus 100 is installed (e.g., a robot arm) through the configuration of a motor, worm gear, worm wheel, and the like.

Figure 15:
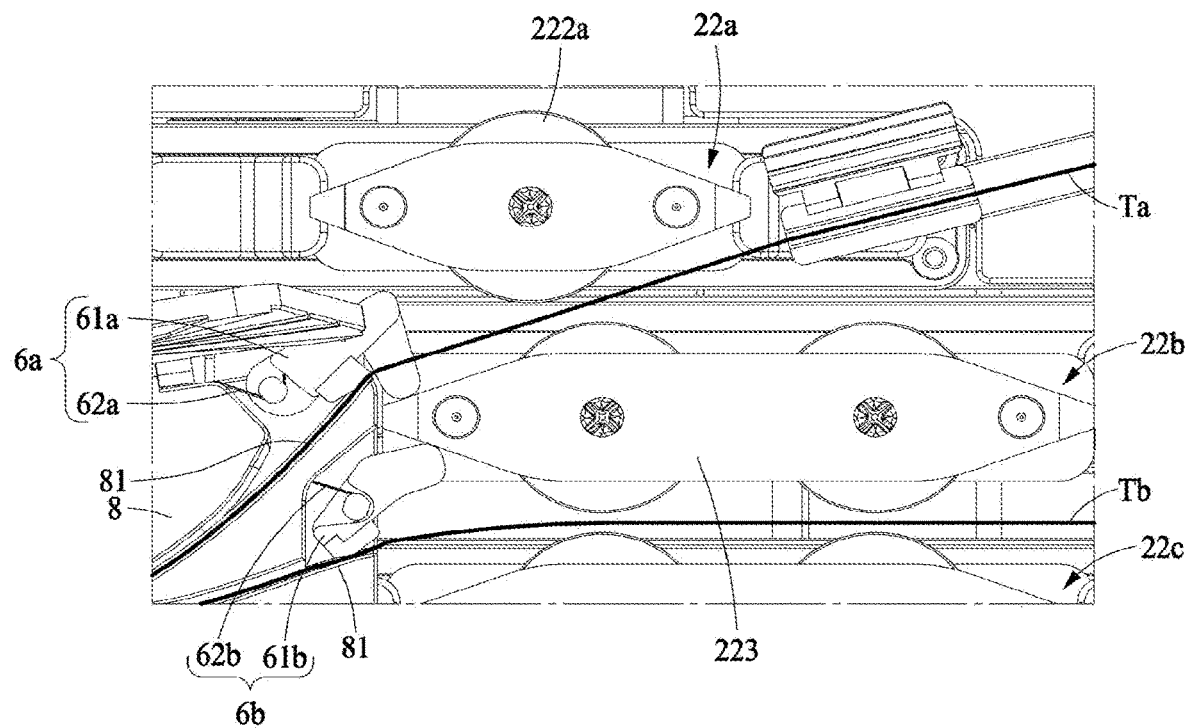
FIGS. 15 to 17 are plan views illustrating a method of operating a clamping portion according to an embodiment.
Figure 16:
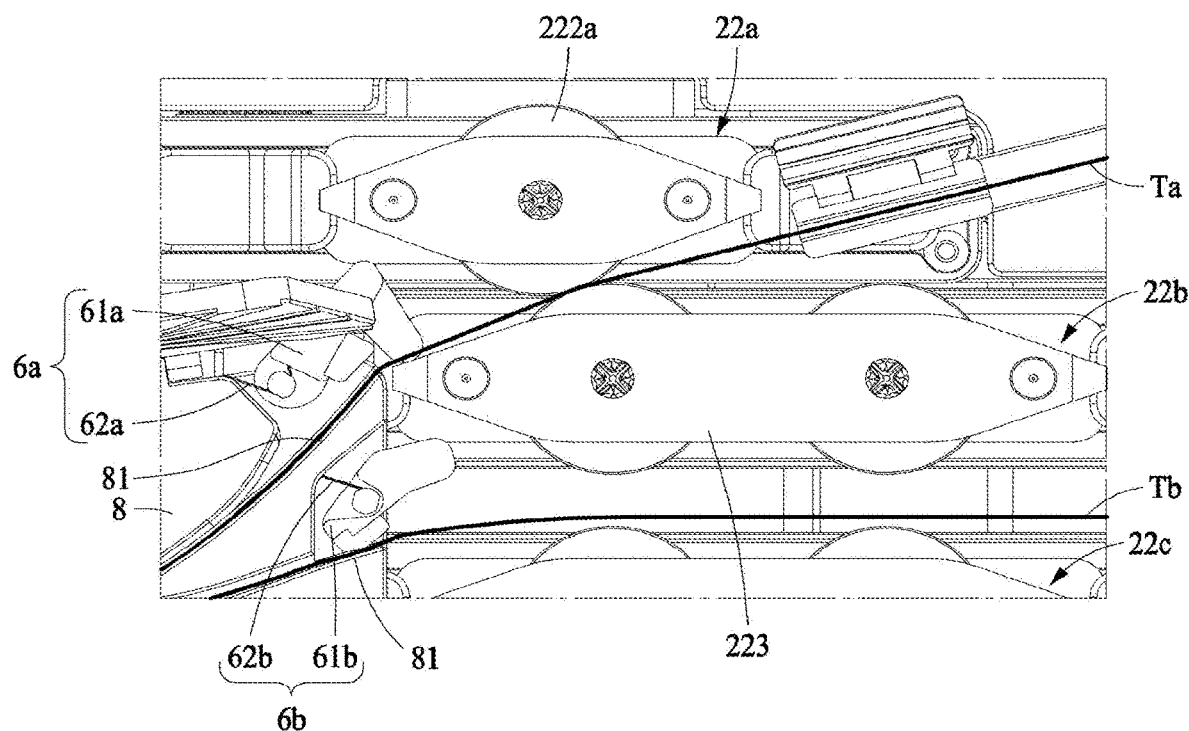
Figure 17:
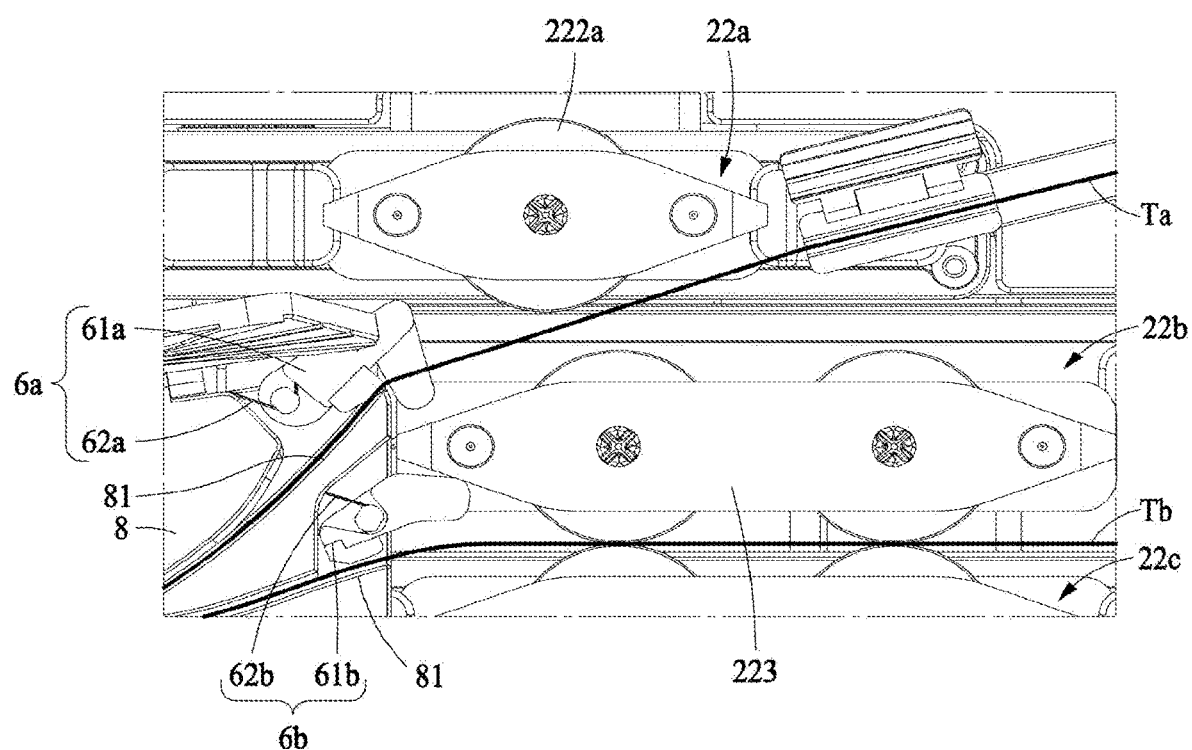

FIGS. 15 to 17 are plan views illustrating a method of operating a clamping portion according to an embodiment.

Referring to FIGS. 15 to 17, the clamping portion 6 may clamp the surgical tool T, that is not gripped by the roller module 22, to fix the position thereof. According to such a configuration, it is possible to prevent the surgical tool T from moving in an unintended direction in a state in which the surgical tool T is not gripped by the roller module 22. In addition, the clamping portion 6 may release the clamping for the surgical tool T gripped by the roller module 22 so that the surgical tool T may be controlled.

The number of clamping portions 6 may correspond to the number of surgical tools T. For example, referring to FIG. 3, the clamping portion 6 may include a first clamping portion 6a, a second clamping portion 6b, a third clamping portion 6c, and a fourth clamping portion 6d. The clamping portions 6a, 6b, 6c, and 6d may be applied to the surgical tools Ta, Tb, Tc, and Td, respectively.

The clamping portion 6 may have a structure capable of automatically clamping or unclamping the surgical tool T in accordance with the horizontal movement of the roller module 22. The clamping portion 6 may include a clamp 61 and an elastic body 62.

The clamp 61 may be a member for clamping the surgical tool T. For example, the clamp 61 may be installed on the Y connector holder 8 (see FIG. 12). In this case, a step 81 may be formed in the Y connector holder 8, and the surgical tool T may be clamped between the clamp 61 and the step 81 of the Y connector holder 8. However, this is merely an example, and the member on a side opposite to the clamp 61 is not limited to the step 81 of the Y connector holder 8. That is, the surgical tool T may be clamped between the clamp 61 and any member positioned opposite to the clamp 61.

The elastic body 62 may press the clamp 61 in one direction so that the clamp 61 may clamp the surgical tool T. For example, the elastic body 62 may press the clamp 61 against the step 81 of the Y connector holder 8. FIG. 15 shows a state in which the roller module 22 is at a neutral position, that is, a state in which an adjacent roller module 22 is not gripping the surgical tool T. In the state shown in FIG. 15, the clamp 61 may be pressed in one direction by the elasticity of the elastic body 62 so that the surgical tool T is clamped between the clamp 61 and the step 81 of the Y connector holder 8.

FIG. 16 shows a state in which the second roller module 22b has horizontally moved toward the first roller module 22a to grip the first surgical tool Ta between the first roller module 22a and the second roller module 22b. Referring to FIG. 16, in a process in which the second roller module 22b horizontally moves toward the first roller module 22a, the second roller 22b may release the clamping of the first surgical tool Ta by pushing the clamp 61a of the first clamping portion 6a in the other direction. Therefore, the first surgical tool Ta may be gripped between the first roller module 22a and the second roller module 22b, and at the same time, the clamping of the first clamping portion 6a may be released, thereby freely controlling the first surgical tool Ta. In addition, in the state shown in FIG. 16, the second surgical tool Tb not gripped by the second roller module 22b and the third roller module 22c may be clamped by the second clamping portion 6b so that the movement thereof is limited.

FIG. 17 shows a state in which the second roller module 22b has horizontally moved toward the third roller module 22c to grip the second surgical tool Tb between the second roller module 22b and the third roller module 22c. Referring to FIG. 17, in a process in which the second roller module 22b horizontally moves toward the third roller module 22c, the second roller 22b may release the clamping of the second surgical tool Tb by pushing the clamp 61b of the second clamping portion 6b in the other direction. Therefore, the second surgical tool Tb may be gripped between the second roller module 22b and the third roller module 22c, and at the same time, the clamping of the second clamping portion 6b may be released, thereby freely controlling the second surgical tool Tb (moving the second surgical tool Tb forward and backward and rotating the second surgical tool Tb). Also, at the same time, in the process in which the second roller module 22b horizontally moves toward the third roller module 22c, the clamp 61a of the first clamping portion 6a may be pressed in one direction again by the elasticity of the elastic body 62a to clamp the first surgical tool Ta. Accordingly, even if the first surgical tool Ta is placed in an un-gripped state, it is possible to prevent the first surgical tool Ta from moving in an unintended direction by the clamping of the first clamping portion 6a.

As shown in FIGS. 15 to 17, the clamp 61 may be rotatably installed around one axis. In this case, the elastic body 62 may generate the elasticity that rotates the clamp 61 in a direction (one direction) toward the step 81 of the Y connector holder 8. In addition, in the process in which the roller module 22 horizontally moves, the clamp 61 may come into contact with the roller housing 223 and may be rotated around one axis in the other direction. An end portion of the roller housing 223 may be formed as an inclined surface to smoothly rotate the clamp 61. Meanwhile, this is merely an example, and the clamp 61 may be formed to be translated in one direction and the other direction.

Although the above description has been made based on the first clamping portion 6a and the second clamping portion 6b, the third clamping portion 6c and the fourth clamping portion 6d may also clamp the third surgical tool Tc and the fourth surgical tool Td, respectively, by the same method as described above. In order to avoid repetitive description, the specific description of the third clamping portion 6c and the fourth clamping portion 6d will be omitted.

Referring to FIGS. 1 to 3, the surgical tool supporter 7 may be provided in the housing 1 and may be positioned at the rear side of the roller module 22. The surgical tool supporter 7 may support the rear side of the surgical tool T at the rear side of the roller module 22. For example, the surgical tool supporter 7 may include a groove in which the surgical tool T is to be placed, and a cover that covers the groove when the surgical tool T is placed in the groove. Accordingly, the user may open the cover to place the surgical tool T in the groove, and close the cover so that the surgical tool T is supported by the surgical tool support 7. The number of surgical tool supporters 7 may correspond to the number of surgical tools T. A plurality of surgical tool supporters 7 may be connected and fixed to one frame.

While the embodiments are described with reference to drawings, it will be apparent to one of ordinary skill in the art that various alterations and modifications in form and details may be made in these embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, other implementations, other embodiments, and equivalents to the claims are also within the scope of the following claims.

The invention claimed is:

1. A surgical tool control apparatus comprising:
a housing; and
a control assembly comprising a frame connected to the housing, and a first roller module, a second roller module, and a third roller module installed on the frame,
wherein the second roller module is configured to move toward the first roller module so that a first surgical tool is gripped between the first roller module and the second roller module, and move toward the third roller module so that a second surgical tool is gripped between the second roller module and the third roller module, and
wherein the control assembly is configured to selectively grip either the first surgical tool or the second surgical tool by movement of the second roller module.

2. The surgical tool control apparatus of claim 1, wherein each of the first roller module, the second roller module, and the third roller module comprises:
a roller plate connected to the frame; and
a roller member rotatably provided on the roller plate.

3. The surgical tool control apparatus of claim 2, wherein, in a state in which the first surgical tool or the second surgical tool is gripped, the gripped first surgical tool or second surgical tool is moved in a longitudinal direction by rotating the roller members of a pair of roller modules gripping the first surgical tool or the second surgical tool.

4. The surgical tool control apparatus of claim 2, wherein, in a state in which the first surgical tool or the second surgical tool is gripped, the gripped first surgical tool or second surgical tool is rotated by vertically moving at least one of the roller members of a pair of roller modules gripping the first surgical tool or the second surgical tool.

5. The surgical tool control apparatus of claim 4,
wherein the roller plate comprises a lower roller plate which is connected to the frame, and an upper roller plate which is positioned above the lower roller plate and to which the roller member is rotatably connected, and
wherein the second roller module further comprises a vertical movement portion configured to vertically move the upper roller plate with respect to the lower roller plate.

6. The surgical tool control apparatus of claim 5, wherein the second roller module further comprises:
a link structure support with a length which is changeable in a vertical direction in response to a spacing distance between the lower roller plate and the upper roller plate, while supporting the upper roller plate with respect to the lower roller plate.

7. The surgical tool control apparatus of claim 5, wherein the vertical movement portion comprises:
a vertical movement driving motor;
a vertical movement pulley configured to receive rotational power from the vertical movement driving motor;
a vertical movement lead screw nut integrally rotating with the vertical movement pulley; and
a vertical movement lead screw that is engaged with the vertical movement lead screw nut and has one side connected to the upper roller plate to vertically move the upper roller plate in accordance with rotation of the vertical movement lead screw nut.

8. The surgical tool control apparatus of claim 3, wherein the second roller module further comprises:
a rotation driving portion configured to rotate the roller member with respect to the roller plate.

9. The surgical tool control apparatus of claim 8, wherein the rotation driving portion comprises:
a rotation driving motor;
a rotation drive pulley configured to receive rotational power from the rotation driving motor;
a spline nut integrally rotating with the rotation drive pulley; and
a spline shaft that is engaged with the spline nut and has one side connected to the roller member to rotate the roller member in accordance with rotation of the spline nut.

10. The surgical tool control apparatus of claim 9, wherein the rotation driving portion further comprises:
a shaft support configured to be positioned between the rotation drive pulley and the spline shaft to prevent wobble of the spline shaft.

11. The surgical tool control apparatus of claim 2, wherein the control assembly further comprises:
a horizontal movement portion configured to horizontally move the second roller module.

12. The surgical tool control apparatus of claim 11, wherein the horizontal movement portion comprises:
a horizontal movement driving motor;
a horizontal movement lead screw configured to be connected to the frame in a horizontal direction and receive rotational power from the horizontal movement driving motor; and
a horizontal movement lead screw nut that is engaged with the horizontal movement lead screw and has one side connected to the roller plate to horizontally move the roller plate in accordance with rotation of the horizontal movement lead screw.

13. The surgical tool control apparatus of claim 1, further comprising:
a guide catheter rotating portion provided in the housing to rotate a guide catheter connected to a front end of the surgical tool control apparatus.

14. The surgical tool control apparatus of claim 1, further comprising:
a housing translational movement portion configured to move the housing forward or backward to a position where the surgical tool control apparatus is installed, to move a guide catheter connected to a front end of the surgical tool control apparatus forward or backward.

15. The surgical tool control apparatus of claim 1, further comprising:
a housing tilting portion configured to tilt the housing with respect to a position where the surgical tool control apparatus is installed.

16. The surgical tool control apparatus of claim 1, further comprising:
a first clamping portion configured to clamp the first surgical tool in a state in which the first surgical tool is not gripped by the first roller module and the second roller module; and
a second clamping portion configured to clamp the second surgical tool in a state in which the second surgical tool is not gripped by the second roller module and the third roller module.

17. The surgical tool control apparatus of claim 16, wherein each of the first clamping portion and the second clamping portion comprises:
a clamp; and an elastic body configured to press the clamp in one direction so that the clamp clamps a surgical tool.

18. The surgical tool control apparatus of claim 17,
wherein, in a process in which the second roller module horizontally moves toward the first roller module to grip the first surgical tool between the first roller module and the second roller module, the second roller module is configured to release clamping of the first surgical tool by the first clamping portion by pushing the clamp of the first clamping portion in an other direction, and
wherein, in a process in which the second roller module horizontally moves toward the third roller module to grip the second surgical tool between the second roller module and the third roller module, the second roller module is configured to release clamping of the second surgical tool by the second clamping portion by pushing the clamp of the second clamping portion in the other direction.

19. The surgical tool control apparatus of claim 1, further comprising:
a surgical tool supporter provided in the housing and positioned at a rear side of the first roller module, the second roller module, and the third roller module, and configured to support a rear side of the first surgical tool or the second surgical tool.

20. The surgical tool control apparatus of claim 1,
wherein the control assembly further comprises a fourth roller module and a fifth roller module, and
wherein the fourth roller module is configured to horizontally move toward the third roller module so that a third surgical tool is gripped between the third roller module and the fourth roller module, and horizontally move toward the fifth roller module so that a fourth surgical tool is gripped between the fourth roller module and the fifth roller module.

21. The surgical tool control apparatus of claim 20,
wherein, in a state in which the first roller module and the second roller module grip the first surgical tool and the third roller module and the fourth roller module grip the third surgical tool, the surgical tool control apparatus is configured to independently control each of the first surgical tool and the third surgical tool, and
wherein, in a state in which the second roller module and the third roller module grip the second surgical tool and the fourth roller module and the fifth roller module grip the fourth surgical tool, the surgical tool control apparatus is configured to independently control each of the second surgical tool and the fourth surgical tool.

* * * * *